US009194522B2

(12) United States Patent
Dzolovic et al.

(10) Patent No.: US 9,194,522 B2
(45) Date of Patent: Nov. 24, 2015

(54) CONNECTOR FITTING

(75) Inventors: Vedran Dzolovic, Park Ridge, IL (US);
David A. Oestermeyer, Downers Grove, IL (US); Alex V. Degutis, LaGrange Park, IL (US); William R. Borowski, Palos Park, IL (US)

(73) Assignee: Salco Products, Inc., Lemont, IL (US)

( * ) Notice: Subject to any disclaimer, the term of this patent is extended or adjusted under 35 U.S.C. 154(b) by 776 days.

(21) Appl. No.: 13/531,209

(22) Filed: Jun. 22, 2012

(65) Prior Publication Data
US 2013/0341919 A1 Dec. 26, 2013

(51) Int. Cl.
*F16L 37/18* (2006.01)

(52) U.S. Cl.
CPC .................................. *F16L 37/18* (2013.01)

(58) Field of Classification Search
CPC ........ F16L 37/18; F16L 47/14; F16L 23/0283
See application file for complete search history.

(56) References Cited

U.S. PATENT DOCUMENTS 2,033,142 A * 3/1936 Lewis ............................ 285/312
2,770,474 A * 11/1956 Krapp ......................... 251/149.6
3,633,948 A * 1/1972 Dickey ........................... 285/312
4,295,670 A * 10/1981 Goodall et al. ................. 285/91
2003/0151252 A1* 8/2003 Dole .............................. 285/312

FOREIGN PATENT DOCUMENTS

DE 2919805 * 11/1979
DE 19914668 A1 * 11/2000 ............... F16L 23/02

OTHER PUBLICATIONS

DE 19914668 (Hintzen Werner) Nov. 11, 2000 (Description portion—English translation) [online].[retrieved on Apr. 30, 2015] Retrieved from the Espacenet Patent search using Internet <URL: http://worldwide.espacenet.com/publicationDetails/biblio?DB=EPODOC&II=0&ND=3&adjacent=true&locale=en_EP&FT=D&date=20001102&CC=DE&NR=19914668A1&KC=A1>.*
DE 2919805 (Spengler Hans Haenni) Nov. 22, 1979 (Description portion—English translation) [online]. [retrieved on Apr. 30, 2015] Retrieved from the Espacenet Patent search using Internet <URL:http://worldwide.espacenet.com/publicationDetails/originalDocument?CC=DE&NR=2919805A1&KC=A1&FT=D&ND=3&date=19791122&DB=EPODOC&locale=en_EP>.*

* cited by examiner

*Primary Examiner* — David E Bochna
*Assistant Examiner* — James Linford
(74) *Attorney, Agent, or Firm* — Leydig, Voit & Mayer, Ltd.

(57) ABSTRACT

A fluid coupling including an annular adapter with a cam receiving groove and an annular coupler slidable onto the adapter with cam levers movable to engage cams within the cam receiving groove. The adapter is made of Ultra High Density Polyethylene and has a metal insert or collar defining the cam receiving groove.

9 Claims, 3 Drawing Sheets

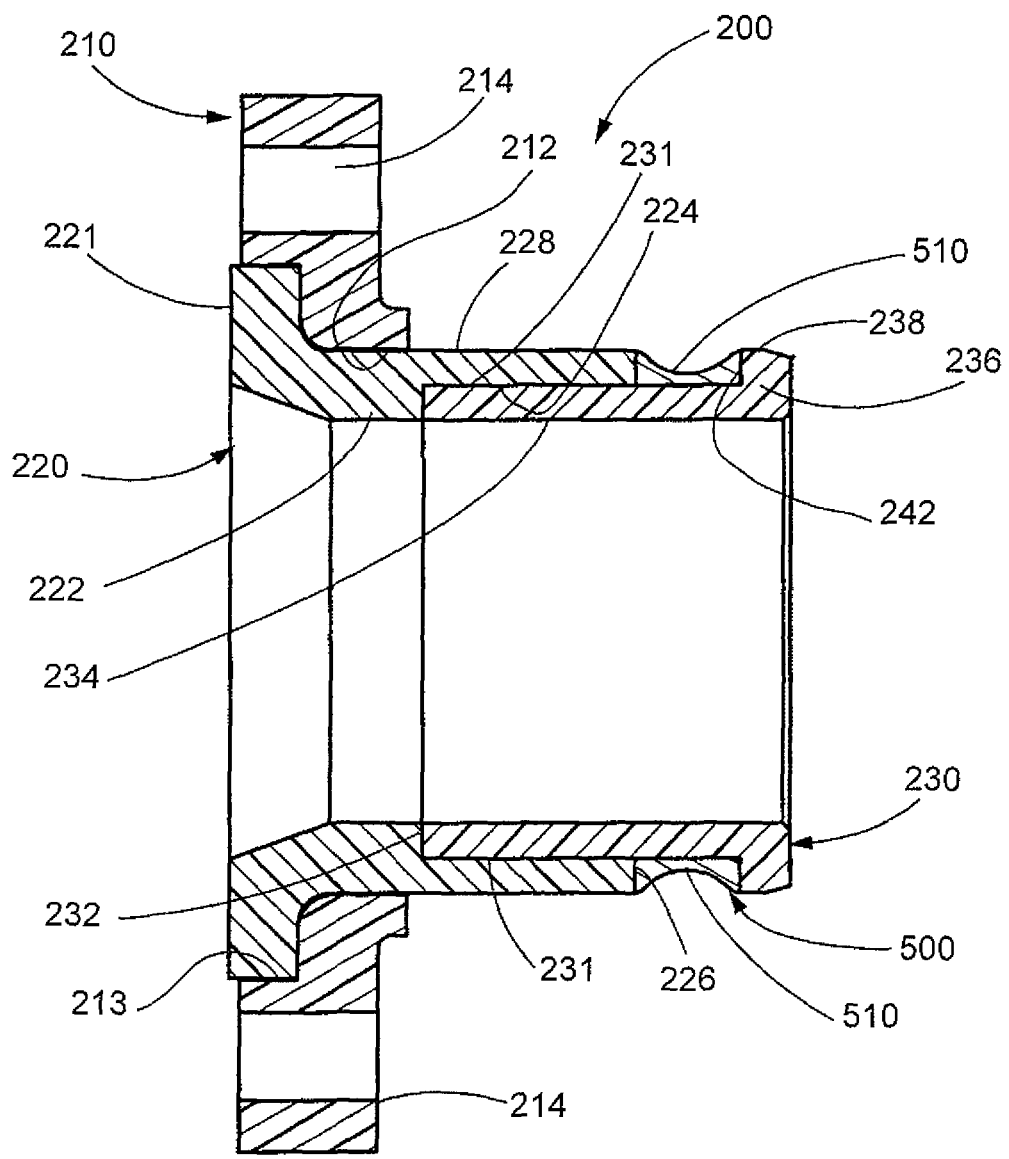

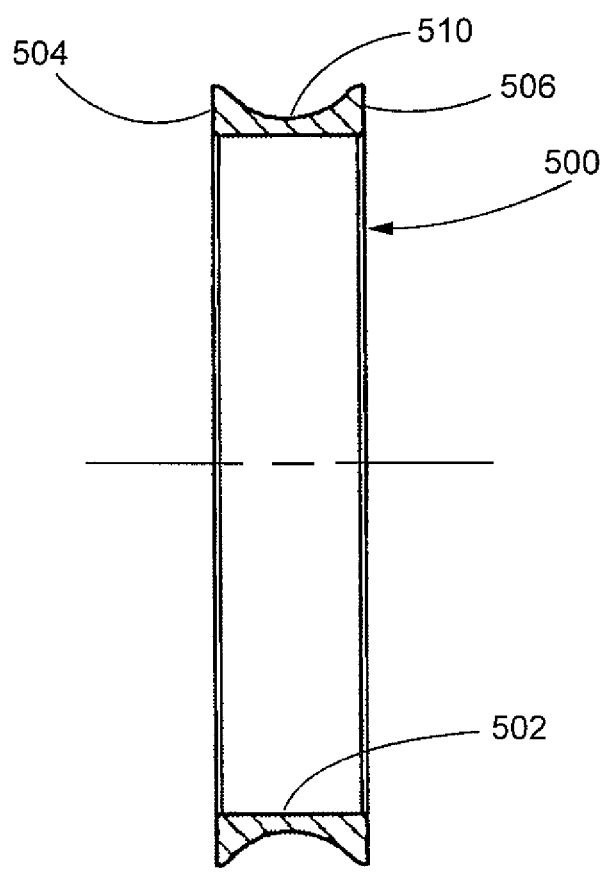

CONNECTOR FITTING

BACKGROUND

This disclosure relates to non-corrosive fittings for releasable connection of fluid lines to transport or storage containers. More particularly, it relates to such fittings that include a quick connect "cam and groove" locking connection.

Liquids used in chemical processing may, in some instances, be extremely corrosive to metal. Metal storage and transport containers must, therefore, be lined with a protective coating, such as rubber to provide reasonable durability to the equipment used in the storage and transportation functions.

One important aspect of liquid storage or transport is the releasable connection of supply or discharge lines to a containment vessel for delivery or removal of the contained liquid. One connection system component widely employed is the "cam and groove" connector coupling. The connector components are easily joined to provide a releasable leak proof relationship between a containment vessel and an attached flexible line or hose.

The fitting, or coupling, includes two components, a tubular receptacle or adapter, usually a part of a containment vessel, and a slidably attachable coupler, usually a part of the fluid line. Often a cover having a similar cam and lever configuration is employed to protect the adapter end when not connected to the fluid line.

The adapter includes a circular concave groove or recess spaced from its open end. The coupler includes a pair of diametrically opposed pivotal cam levers with retention cams pivotal to a locked position to engage within the groove to releasably connect the coupling components. After use of the connected line, the cam levers are pivoted to move the cams to an unlocked position to slidably remove the coupler from the adapter. The cover may then be placed on the open end of the adapter and the pivotal arms of the cover moved to the locked position to releasably secure the cover to the adapter.

Polymeric material such as Ultra High Molecular Weight Polyethylene Material (UHMWP) has become a useful material in the storage and transport of corrosive liquids. This material, however, is relatively soft, and subject to abrasion and or deformation under load. While it is desirable to have a coupling adapter made from such material it is impractical to subject a groove or recess formed to receive the retention cams to the load of the cam elements of the coupler.

SUMMARY OF DISCLOSURE

The present disclosure is directed to a coupling arrangement having an adapter made of non-corrosive polymeric material, preferably UHMWP, that includes a cam receiving groove defined by a metallic insert. The adapter of the disclosure is sufficiently durable to withstand repeated closure of the pivotal retention cam elements on the concave cam receiving surfaces of the adapter and possesses sufficient strength to accept the load of an attached transmission hose or flexible pipe and the forces attendant to manipulation of the line during use.

DESCRIPTION OF THE DRAWINGS

FIG. 2 is a sectional side view of the adapter element of the coupling of FIG. 1;

FIG. 3 is a sectional side view of the reinforcement collar of the adapter illustrated in FIGS. 1 and 2.

DETAILED DESCRIPTION OF THE ILLUSTRATED EMBODIMENT

Figure 1:
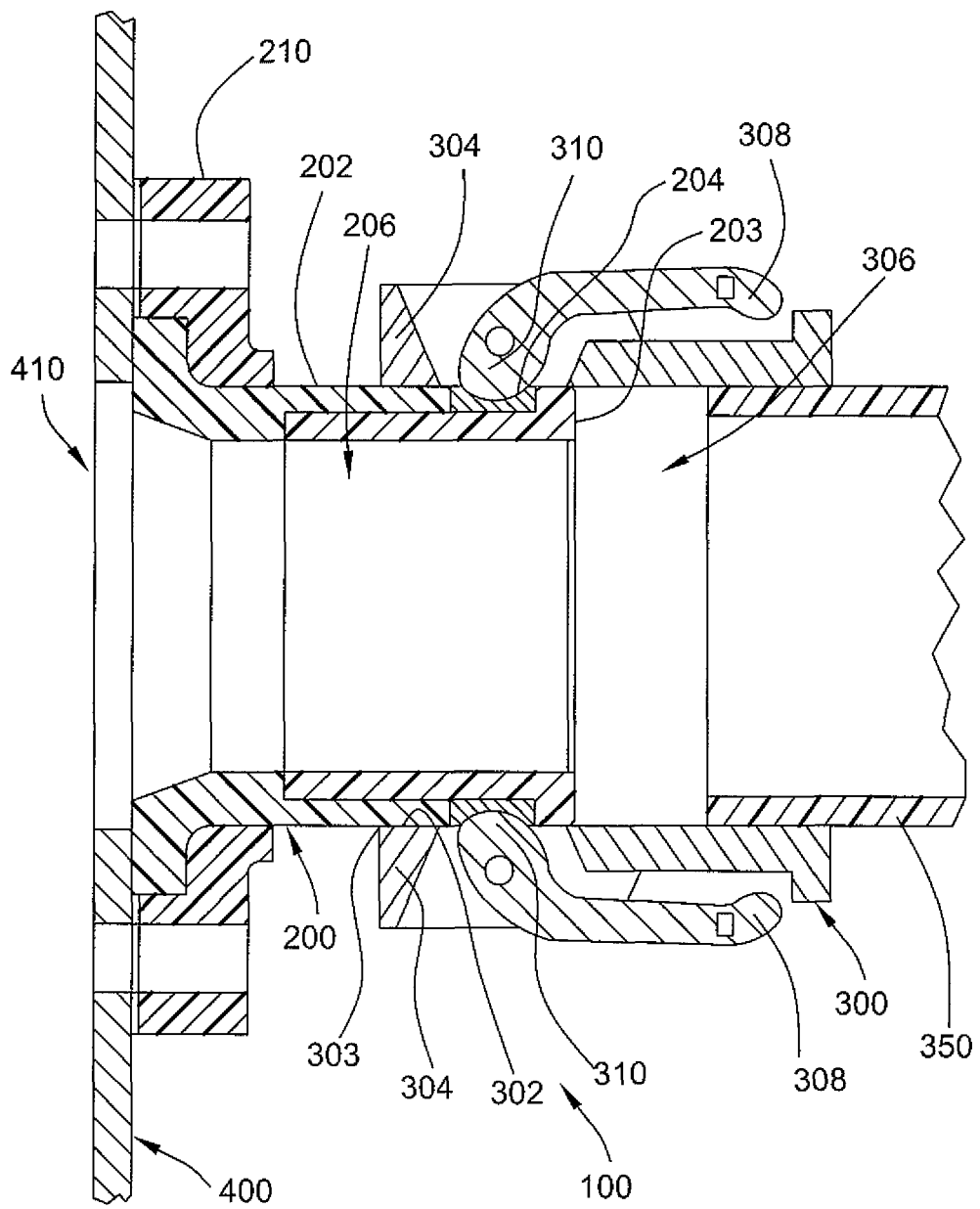
FIG. 1 is a sectional plan view of a connector coupling illustrative of the principles of the present disclosure.

A connector fitting or coupling of the present disclosure, generally designated 100, is illustrated in FIG. 1. It is a generally annular structure and includes an adapter 200 made of Ultra High Molecular Weight Polyethylene Material (UHMWP) and a coupler generally designated 300.

Adapter 200 is a hollow tubular element with an open end 203. The other end is adapted to be secured to a containment vessel 400 in fluid tight relation. It defines internal flow passage 206 which provides ingress or egress to port 410 of vessel 400.

Adapter 200 defines an outer cylindrical pilot 202 adapted to releasably receive coupler 300 in slidable telescoping relation upon pilot 202. Outer cylindrical pilot 202 includes an external, annular axially extending concave groove 204 utilized in the connection of the coupler 300 to the adapter 200, as will be understood.

Coupler 300 is a hollow tubular element illustrated as associated with a flexible line or hose 350. It defines an inner cylindrical surface 302 defining an internal flow passage 306. It is sized to slide onto open end 203 of the adapter 200 in closely spaced supporting relation. Flexible hose or tube 350 extends from its other end. The hose or tube 350 is part of a fluid transmission system for transfer of fluid to or from an associated containment vessel.

Coupler 300 has diametrically opposed flanges 304. Lever arms 308 are pivotally supported on flanges 304. Each includes an asymmetrically shaped retention cam 310 pivotal between locked and unlocked positions. In the unlocked position, inner cylindrical surface 302 of coupler 300 can be slid onto the open end 203 of adapter 200 in overlying sliding relation to outer cylindrical pilot 202 to connect the passage or port 410 of containment vessel 400 through the fitting 100 to the passage defined by the hose 350. As illustrated in FIG. 1, levers 308 are positionable into a locked position in which cams 310 are disposed in annular groove 204 to secure the coupler 300 to the adapter 200.

Though not illustrated, it is well known that a cap may be provided with lever anus and retention cams similar to lever arms 308 and retention cams 310 of coupler 300 for installation onto the open end 203 of adapter 200 when not connected to coupler 300.

It should be appreciated that the adapter 200 and coupler 300 are illustrative of the principles of the present disclosure and could take many other forms. For example, an adapter could form the end of a line, tube or hose, and a component with the configuration of coupler 300 could be permanently affixed to a containment vessel, or to another fluid line.

Turning now to FIGS. 2 and 3, the details of adapter 200, made from UHMWP, are shown and described. The body of adapter 200 includes a separate flange 210, and a base 220 and a tubular retention sleeve 230 secured together by friction or spin welding.

Flange 210 is arranged to connect the adapter 200 to a containment vessel. A series of bolt holes 214 extend about the flange to receive connection bolts (not shown). Usually a gasket is positioned between the flange 210 and containment vessel 400 to ensure a fluid tight relation. Flange 210 includes central bore 212 to receive base 220. It has a counter bore 213 at one end.

It should be appreciated that the configuration of the adapter 200 as including a flange 210 shown is illustrative. It could take any suitable form and could be connected to the containment vessel by an suitable fastening method such as threading into a boss on the containment 400 or other suitable alternatives.

The base 220 includes a web 221 to engage with flange 210 within counter bore 213. Base 220 includes an inner cylindrical surface 222 that defines a portion of internal flow passage 206 of adapter 200. A counter bore 224 extends from annular end surface 226. It is of a diameter larger than the diameter of inner cylindrical surface 222 and is sized to receive a portion of retention sleeve 230. Outer cylindrical surface 228 extends from annular end surface 226 and is sized to define a portion of outer cylindrical pilot 202 of adapter 200.

Retention sleeve 230 is generally cylindrical and includes an outer cylindrical surface 231 that slides into counter bore 224. An end 232 abuts the bottom of the counter bore 224 in base 220. Retention sleeve 220 defines an inner cylindrical surface 234 that is coextensive with inner cylindrical surface 222 of base 220. Together these surfaces define the internal flow passage 206.

Retention sleeve 230 includes a radial flange 236 at its free end with an outer cylindrical surface 238 coextensive with outer cylindrical surface 228 of base 220. Together these surfaces define the outer cylindrical pilot 202 of adapter 200.

Flange 236 of retention sleeve 230 includes annular radial surface 242 facing outer annular end surface 226 of base 220. Together with outer cylindrical surface 231 of retention sleeve 230 these facing radial surfaces define an annular notch surrounding the exterior of adapter 202.

Separate annular collar 500 best seen in FIG. 3 is made of a continuous metal ring. Any suitable material such as stainless steel may be used. It includes an inner cylindrical surface 502 sized to slidably engage upon outer cylindrical surface 231 of retention sleeve 230. It includes radial annular end surfaces 504 and 506 spaced apart a distance equal to the axial extent of the notch surrounding outer cylindrical pilot 202 of adapter 200.

The outer axial surface 510 of collar 500 is axially concave facing radially outward. The diameter of collar 500 at its ends is coextensive with the outer cylindrical pilot 202. Its central portion is formed on a smaller diameter compatible with the shape of cams 310 of cam levers 308 of adapter 300. It receives all contact from engagement with locking cams 310 of an attached adapter, such as adapter 300 illustrated in FIG. 1 or a similar cam arrangement associated with a protective cap (not shown) attached to the adapter when not connected to a fluid line.

The adapter of FIGS. 2 and 3 is assembled from the separate components, a body comprising flange 210, base 220, and retention sleeve 230 made of UHMWP and metal insert or collar 500 using friction or spin welding techniques. Base 220 is inserted through central bore 212 in flange 210 and web 221 is welded within the counterbore 213 of flange 210.

Stainless steel collar 500 is slid onto the outer cylindrical surface 231 of retention sleeve 230 until radial end surface 504 abuts the annular end surface 226 of base 220. Retention sleeve 230 is slid into counter bore 224 of base 220 until end 232 abuts the bottom of the counter bore 224. At this position, the radial end surface 504 of the collar 500 abuts radial annular surface 224 of base 220 and radial annular surface 242 of flange 236 abuts radial end surface 506. The separate collar 500 is captured between base 210 and retention sleeve 230. It defines the external concave groove 220 on the exterior of outer cylindrical pilot 202 that receives retention cams 310 of cam lever arms 308. The retention sleeve 230 is friction welded to the base 220 to complete the coupler component.

The illustrated fluid coupling 100 with an adapter 200 made of non-corrosive material, preferably UHMWP, and a cam receiving groove defined by a metallic insert 500 is sufficiently durable to withstand repeated closure of the pivotal retention cam elements 310 on the concave cam receiving surface 510 of the adapter insert 500. As a continuous ring, insert 500 possesses sufficient strength to accept the load of an attached coupler 300 and transmission hose 350 or flexible pipe and the forces attendant to manipulation of the line during use.

Various features of the present invention have been described with reference to the above illustrative embodiments. It should be understood that modifications may be made without departing from the scope of the invention as represented by the following claims.

The invention claimed is:
1. An annular fluid coupling adapter comprising:
a hollow tubular polymeric body defining a flow passage and an outer cylindrical pilot to slidably receive a coupler;
an annular concave groove surrounding said outer cylindrical pilot, said concave groove defined by a metal collar;
wherein said adapter body comprises a base having an inner cylindrical surface defining a portion of said flow passage and having a counter bore extending from an end thereof and a retention sleeve having an outer cylindrical surface disposed in sliding relation to said counter bore and said retention sleeve having an end defining a radial flange and said collar is captured between said end of said base and said flange of said retention sleeve; and
wherein said radial flange has an annular radial surface and said collar includes an inner cylindrical surface slidable on said outer cylindrical surface of said retention sleeve, a first radial end surface of said collar in abutting relation to said end of said base, and a second radial end surface of said collar in abutting relation to said annular radial surface of said flange of said retention sleeve.
2. An annular fluid coupling adapter as claimed in claim 1 wherein said groove defined by said metal collar is axially concave facing radially outward having spaced ends having a diameter coextensive with said outer cylindrical pilot and a central portion having a diameter smaller than said outer cylindrical pilot.
3. An annular fluid coupling adapter as claimed in claim 2 wherein said metal collar is a continuous metal ring.
4. An annular fluid coupling adapter as claimed in claim 3 wherein said adapter is formed of multiple components friction welded together to form said to said adapter body.
5. An annular fluid coupling adapter as claimed in claim 1 wherein said adapter includes a separate flange, said flange secured to said base by friction welding, and including a series of bolt holes to secure said adapter to a containment vessel.
6. An annular fluid coupling adapter as claimed in claim 5 wherein said base includes a web, and said flange includes a central bore having a counter bore, said web of said base disposed in said counter bore of said flange.
7. An annular fluid coupling adapter as claimed in any one of claims 1 through 4 and 5, 6 wherein said polymeric material is ultra high molecular weight polyethylene.
8. An annular fluid coupling adapter as claimed in any one of claims 1 through 4 and 5, 6 wherein said metal collar is made of stainless steel.
9. An annular fluid coupling adapter as claimed in any one of claims 1 through 4 and 5, 6 wherein said polymeric material is ultra high molecular weight polyethylene, and
said metal collar is made of stainless steel.

* * * * *